United States Patent [19]
Acarlar

[11] Patent Number: 5,123,066
[45] Date of Patent: Jun. 16, 1992

[54] MOLDED OPTICAL PACKAGE UTILIZING LEADFRAME TECHNOLOGY

[75] Inventor: Muvaffak S. Acarlar, Allentown, Pa.

[73] Assignee: AT&T Bell Laboratories, Murray Hill, N.J.

[21] Appl. No.: 691,623

[22] Filed: Apr. 25, 1991

[51] Int. Cl.[5] .......................... G02B 6/00; G02B 6/36
[52] U.S. Cl. ........................................................ 385/14
[58] Field of Search ..... 350/96.10, 96.15, 96.20–96.21

[56] References Cited

U.S. PATENT DOCUMENTS

| | | | |
|---|---|---|---|
| 4,307,934 | 12/1981 | Palmer | 350/96.20 |
| 4,410,469 | 10/1983 | Katagiri et al. | 350/96.20 X |
| 4,633,582 | 1/1987 | Ching et al. | 29/827 |
| 4,752,109 | 6/1988 | Gordon et al. | 350/96.20 |
| 4,798,440 | 1/1989 | Hoffer et al. | 350/96.20 |
| 4,911,519 | 3/1990 | Burton et al. | 350/96.20 |
| 4,913,511 | 4/1990 | Tabalba et al. | 350/96.20 |
| 4,920,262 | 4/1990 | Aiki et al. | 350/96.20 |

*Primary Examiner*—Akm E. Ullah
*Attorney, Agent, or Firm*—Wendy W. Koba

[57] ABSTRACT

An optical communication arrangement and method is disclosed which utilizes a combination of leadframe and package molding technology to reduce the complexity of the arrangement. In general, a leadframe is utilized for the placement and connection of the required electronic circuitry. An optical device is also coupled to the leadframe, where a subassembly may be used to house the optical device. The electronics and optics are then simultaneously encapsulated in a molded outer package to form the final arrangement. In one embodiment, an optical subassembly incorporating a fiber optic connector receptacle may be utilized, wherein the molded outer package is configured such that the connector receptacle remains exposed. Aternatively, the molded outer package may be configured to include the connector receptacle.

38 Claims, 7 Drawing Sheets

MOLDED OPTICAL PACKAGE UTILIZING LEADFRAME TECHNOLOGY

BACKGROUND OF THE INVENTION

1. Technical Field

The present invention relates to improved packaging techniques for optical communications systems and, more particularly, to optical packaging techniques utilizing molded leadframe arrangements.

2. Description of the Prior Art

There exist many different arrangements for packaging optical communication arrangements. For example, the optical device (e.g., laser, LED or photodiode) may be attached to a mount which is subsequently aligned with and attached to a base member, the base member utilized to facilitate coupling of an optical fiber to the optical device. In most cases, the base member will include a lensing element to maximize the optical coupling. The arrangement of the mounted optical device, base member and lens is often referred to in the art as an "optical subassembly", or OSA. The electronics required for operating the optical device (a driver circuit for a transmitter or an amplification and decision circuit for a receiver, for example) may then be separately assembled (on a printed wiring board, for example) and connected to the optical subassembly by conventional electrical leads. Alternatively, the electronics may be fully enclosed in a separate housing, with only the leads exposed for connection to the optical subassembly. An advantage of using separate housings for the electronics and optics relates to the ability to interchange the components as required for different applications. For example, a data link application may operate with TTL electronic signals, and another application (with the same optics) may utilize ECL electronic signals. Additionally, if either the electrical or optical portion of an arrangement were to experience a failure, the working portion could be disconnected and re-used with another arrangement. A major disadvantage of separate packaging is the overall size of the resultant arrangement. With two separate packages, the arrangement requires a rather large space. Further, such an arrangement is susceptible to electrical noise introduced by the necessarily long lead lengths between the electronics and the optical device. The electrical noise factor becomes a significant concern at bit rates exceeding approximately 10 Mb/s. Also, long leads may limit the maximum bit rate of either a transmitter or receiver, due to parasitic lead inductance (limits transmitter) or parasitic capacitances (limits receiver).

These and other concerns have led to the development of package designs which provide for the electronics and optical device to be housed in the same unit. Many of these unitary packages are relatively expensive, as a result of using a hybrid integrated circuit (HIC) arrangement for the electronics, with an optical subassembly attached to the HIC. Additionally, the piece parts used in the optical subassemblies associated with these packages are often formed of machined metallic components, adding to the cost of the system. Fabrication problems may also exist with respect to mating the various piece parts (i.e., outer housing, optical subassembly and HIC). Lastly, in many instances, the packaging processes for a transmitter and receiver are often very distinct, leading to manufacturing problems and increasing the overall expense of the packaged system.

An improved package design is disclosed in U.S. Pat. No. 4,911,519 issued to W. H. Burton et al. on Mar. 27, 1990. In the disclosed arrangement, the HIC of a conventional package is replaced by a conventional 16-pin dual-in-line package (DIP) which includes a specialized pair of end prong leads for attachment to the optical subassembly (OSA). The DIP and optical subassembly are subsequently assembled within a plastic molded package frame. The plastic molded frame is configured to include a molded optical connector receptacle for subsequent attachment of a connectorized optical fiber. The arrangement is subsequently covered with a metallic lid which is grounded to the package floor. A significant savings is realized by the utilization of the DIP, as well as utilizing a molded plastic piece part for the frame/connector assembly.

Although the Burton et al. arrangement is considered to be a significant advance over the prior art, the need remains to further simplify optical packaging techniques, with respect to limiting the number of separate assembly operations, in light of rapidly growing markets which will require many thousands of such devices in as a cost competitive arrangement as possible.

SUMMARY OF THE INVENTION

The need remaining in the prior art is addressed by the present invention which relates to optical packaging techniques and, more particularly to the utilization of transfer molded leadframe-based packages.

In accordance with an exemplary embodiment of the present invention, a leadframe section is utilized for placement and attachment of electronic circuitry required for the operation of an associated optical device (e.g., a driver circuit for an optical transmitter and/or amplifier-decision circuit for an optical receiver). The semiconductor optical device is coupled to the leadframe and the associated electronics. The optics and electronics are subsequently encapsulated by a suitable material (e.g., plastic) using molding techniques.

An exemplary arrangement of the present invention may utilize an optical device (and lensing element(s), if required) inserted within a conventional optical subassembly (OSA), where the OSA is connected by electrical leads to the leadframe. The electronics and OSA are subsequently encapsulated using molding techniques to form the final package. The molding operation is performed so as to create a connector receptacle as a unitary member of the outer package housing.

In an alternative embodiment of the present invention, the above-described OSA is replaced by the direct attachment of an optical device (for example, a lensed LED) to the leadframe. In particular, the leadframe is configured to include a paddle-like lead for attachment of a first major surface of the optical device. Depending upon the type and placement of the optical device, the paddle may be designed to include an aperture aligned with the active region of the optical device so as to allow for the passage of an optical signal therethrough. A second lead is coupled to the opposing major surface of the optical device to provide the remaining electrical connection. A base member is attached to the leadframe in alignment with the leadframe aperture and utilized to facilitate the coupling of an optical fiber to the optical device. The base member may include a coupling lens and be configured to provide a connector receptacle, utilized to provide the physical attachment of a connectorized optical fiber to the package. Alternatively, a conventional optical base member may be utilized and the outer package molded to include the connector receptacle, as described above.

In yet another embodiment of the present invention, a conventional OSA base member is replaced by a piece part which comprises both a base member and connector receptacle. For this embodiment, the molding of the outer package is simplified since there is no need to mold a receptacle feature.

An advantage of the single-step molded packaging technique of the present invention is that the resultant arrangement comprises, for example, a conventional 16-pin dual-in-line (DIP) package similar to standard integrated circuits. Conforming to the standardized packaging design is further advantageous in that the tools required to form the package conform to international standards. Further, the standardized package body allows for the utilization of automated pick-and-place machinery in any subsequent assembly operations.

Another advantage of the present invention relates to the simplification of the overall fabrication process, that is, the utilization of a single molding operation to house both the electronics and optics, as well as provide the final package housing. Therefore, the single molding step replaces the numerous separate encapsulation steps of conventional arrangements. Additionally, in accordance with the benefits of leadframe technology, several such packages may be formed simultaneously along the length of the associated leadframe, thus increasing the throughput of the fabrication process.

A further advantage of the present technique is that the combination of leadframe-based assemblies and molded packaging is not dependent upon the properties of the arrangement. That is, the present techniques are equally applicable to forming optical transmitters, receivers, and/or transceivers which are utilized in applications ranging from optical data links to fiber-to-the-home products to FDDI-compatible arrangements. Additionally, the package may be arranged to include leads which exit through the floor of the package (for later insertion through a printed circuit board, for example) or exit through the sidewalls of the package (for surface mounting or circuit board insertion, for example). The location of the connector receptacle (e.g., sidewall vs. top surface) is also considered to be discretionary.

Another advantage of the present invention relates to the attachment of the optics and electronics to the same leadframe, usually during sequential manufacturing operations. This advantage reduces the number of separate piece parts and allows for the use of simplified assembly methods, significantly reducing the cost of the final product.

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
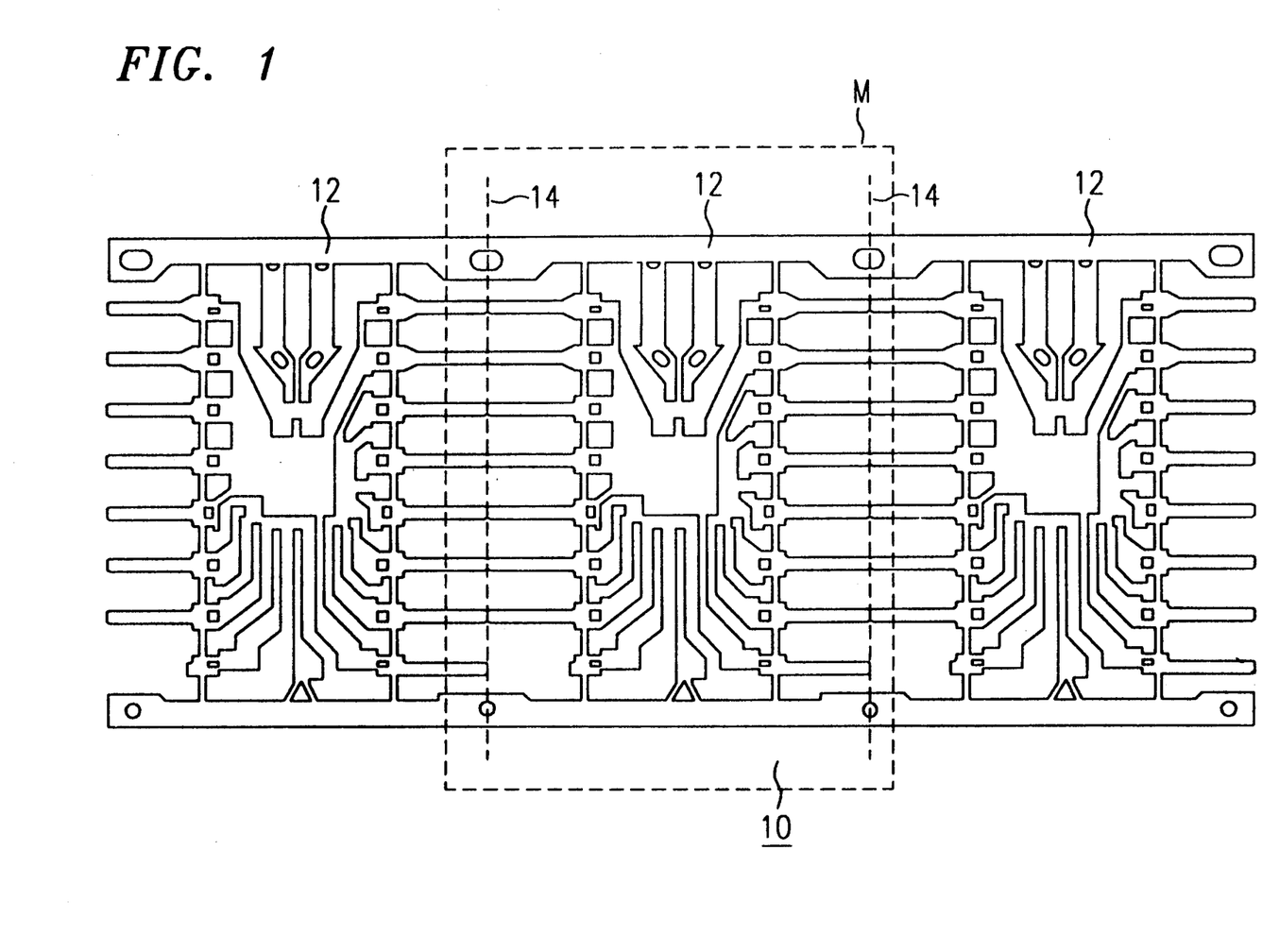
FIG. 1 illustrates an exemplary leadframe arrangement suitable for use in association with the teachings of the present invention.

Referring to FIG. 1, an exemplary leadframe 10 is illustrated which includes a large number of severable leadframe sections for use with a number of separate opto-electronic packages. It is an advantage of the present invention that the use of a leadframe structure allows for the simultaneous fabrication of a large number of opto-electronic packages, such as transmitters, receivers or transceivers. Similar to conventional electronic integrated circuit processing, a plurality of integrated circuits may be simultaneously attached and wirebonded along locations 12 of leadframe 10. In accordance with the teachings of the present invention, an associated plurality of optical devices are coupled to leadframe 10 at locations 12 and the combination of electronics and optics encapsulated using a molding process (e.g., transfer molding) as described in detail below, to form the final packaged assembly (as indicated by the dotted package outline M). When the molding operation is completed, leadframe 10 may be severed along dotted lines 14 to form a plurality of final package assemblies. The remaining figures illustrate a single leadframe section and the various items associated therewith. It is to be understood that the illustration of a single leadframe section is only for the sake of discussion and in general a larger number of opto-electronic assemblies are simultaneously formed in production.

Figure 2:
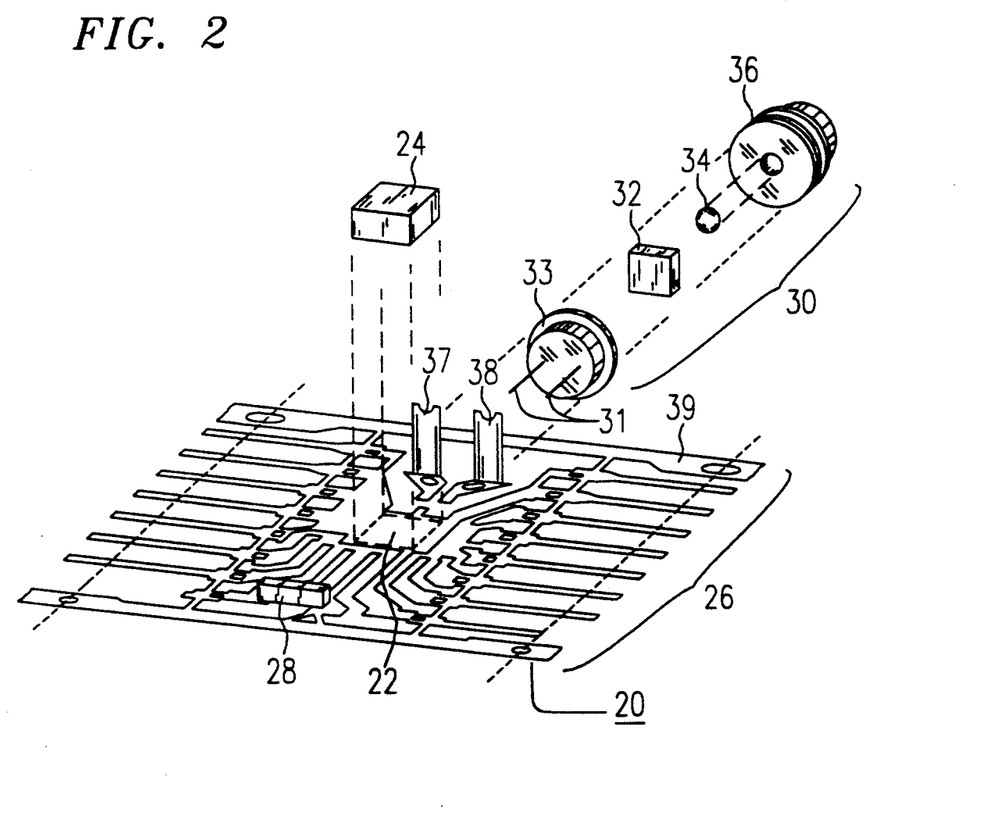
FIG. 2 illustrates a portion of the leadframe of FIG. 1 illustrating in particular the attachment thereto of the requisite electronic circuitry and associated optical subassembly.

A single leadframe section 20 is particularly illustrated in FIG. 2. Section 20 includes a central ground plane paddle 22 to which an integrated circuit 24 is attached. Integrated circuit 24 is subsequently coupled, using wirebonds, for example, to selected leads 26 of leadframe section 20. A separate capacitive element 28, which may be required for certain receiver configurations, is attached to leadframe section 20 as shown in FIG. 2. An optical subassembly (OSA) 30 (shown in an exploded view in FIG. 2), includes an optical device 32 supported on a mount 33 including electrical leads 31 and, possibly, a lensing element 34 which is embedded within a base member 36, where base member 36 may comprise a material compatible with the molded housing of the outer package (e.g., liquid crystal polymers, molded plastic, machined plastic, or machined metal). Electrical leads 31 of OSA 30 are then attached to leadframe section 20, using, for example, a pair of end prong leads 37, 38 located at one end 39 of leadframe section 20. As shown in FIG. 2, end prong leads 37, 38 may be bent upwards at an angle of approximately 90° with respect to the plane of leadframe 20 so as to accommodate the orientation of the desired optical connection (not shown). Alternatively, leads 31 of OSA 30 may be bent downward, with end prong leads 37, 38 remaining in the plane of leadframe 20. As will be described in detail below, the combination as illustrated in FIG. 2 is subsequently encapsulated using a molding operation to form the final packaged assembly.

Figure 3:
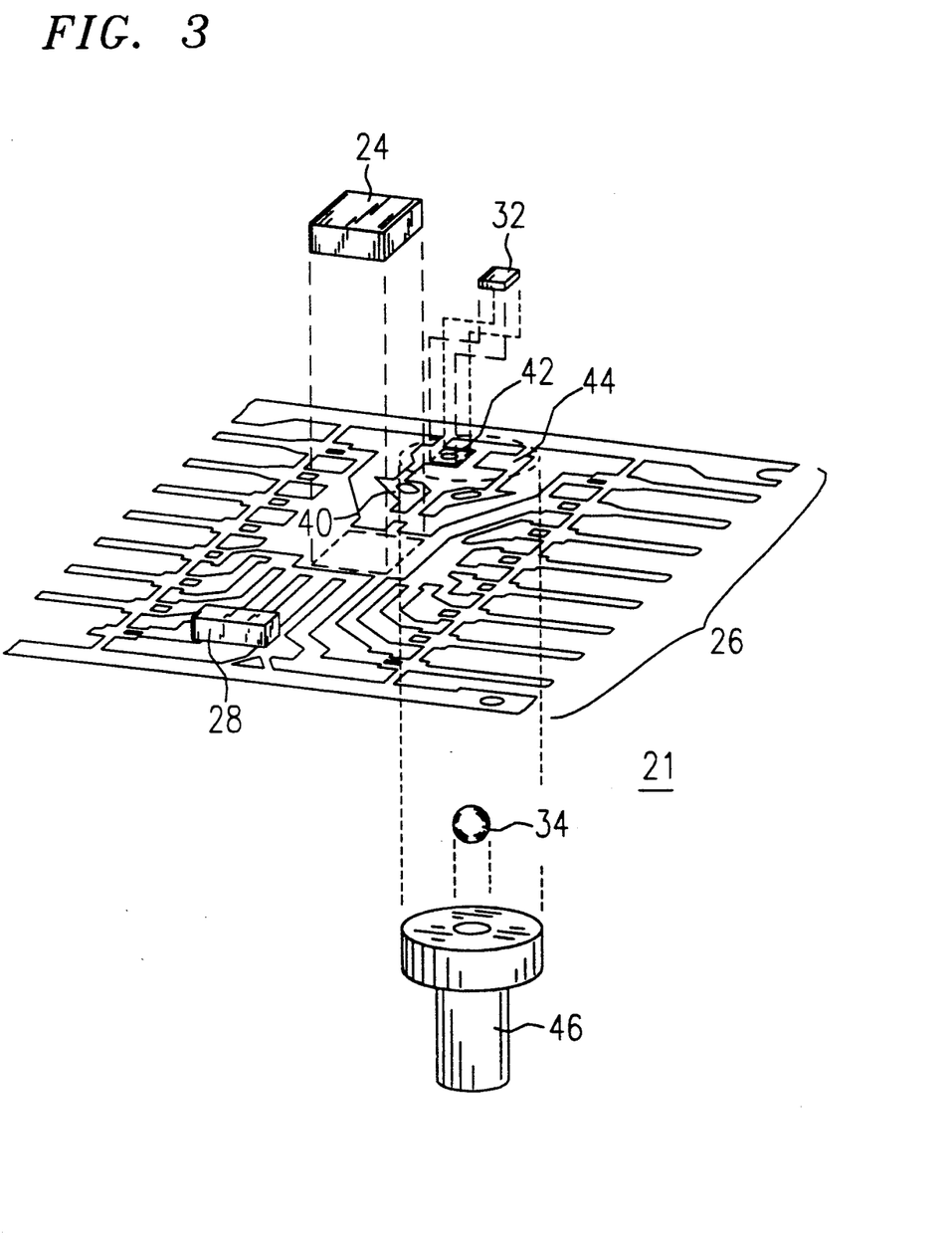
FIG. 3 illustrates a portion of an alternative leadframe arrangement particularly suited for an embodiment of the present invention wherein the optical device is directly attached to the leadframe and a separate base member (which may comprise a connector receptacle) is aligned to the attached optical device.

FIG. 3 illustrates an alternative arrangement which may also be encapsulated to form an opto-electronic package in accordance with the teachings of the present invention. The electronic integrated circuit portion 24 is identical to that described above in association with FIG. 2. In contrast, however, optical device 32 is directly mounted on a leadframe section 21, without any separate optical subassembly housing. In particular, optical device 32 is mounted on a leadframe paddle 40 formed as a portion of leadframe section 21. As shown, paddle 40 may be formed to include an aperture 42 to allow the passage of an optical signal therethrough (alternatively, device 32 may be mounted on the opposite side of paddle 40 such that the emitting (or receiving) surface of device 32 is unobstructed). The remaining connection to optical device 32 is supplied by a lead 44 formed adjacent to paddle 40. An advantage of this embodiment is the ability to simplify the assembly process related to the placement and attachment of the electronics and optics. In particular, the placement of integrated circuit 24 and optical device 32 along the same physical plane (i.e., the plane of leadframe 21) allows for the automated attachment operations to be performed simultaneously for both the electronics and optics. Subsequent to the optical device attachment, base member 46 may be attached to the back side of leads 40 and 44, as shown in FIG. 3, to form the coupling optics. The portion of the leadframe holding optical device 32 with the attached base member 46 may then be bent upwards 90° to take the form shown in FIG. 4.

Figure 4:
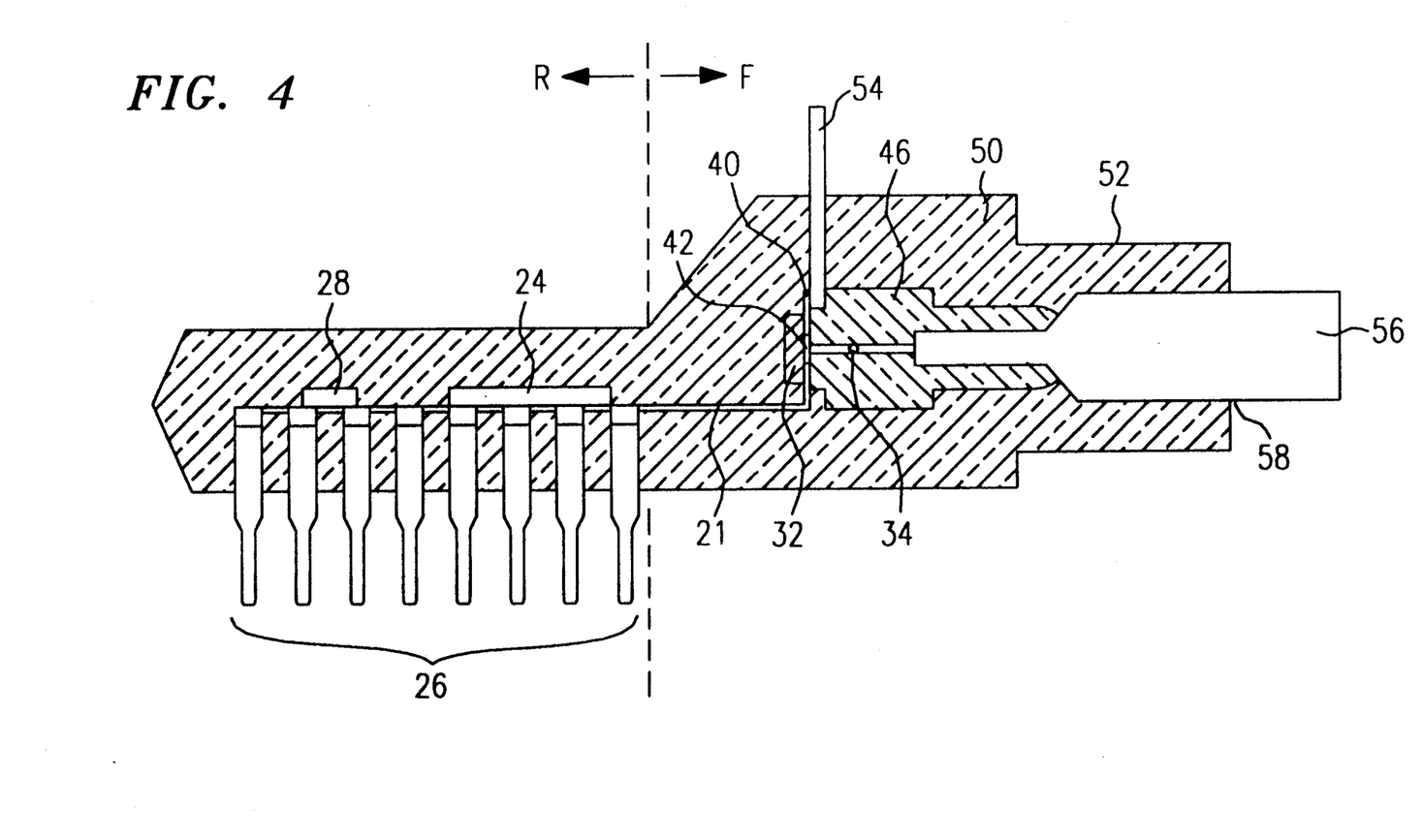
FIG. 4 illustrates a cut-away side view of an exemplary molded package including the electronics and optics as illustrated in FIG. 3.

A final packaged version of the arrangement of FIG. 3 is illustrated, in a cut-away side view, in FIG. 4. A similar package would be formed for the arrangement of FIG. 2. As shown, a molded outer package 50 is formed so as to completely encapsulate both electronics 24 and optics 32 (including base member 46, or OSA 30 of the FIG. 2 embodiment). Rear portion R of package 50 comprises a molded body which may approximate, for example, the size and shape of a conventional 16-pin dual-in-line package (DIP). Other configurations may be utilized. However, conforming to the standardized package design has been found to simplify the design of the molding tool, as well as trim-and-form tools, since rear portion R conforms to international packaging standards. More importantly, the use of a conventional package design allows for automated machinery (e.g., pick-and-place) to be used in the subsequent assembly of the package on a printed circuit board or the like. Forward portion F of package 50 is shown to flare upward to accommodate the dimensions of base member 46. As will be discussed in detail hereinafter, package 50 may be molded to include a connector receptacle 52 as part of the final package.

As mentioned above, an exemplary molding technique which may be used to form package 50 is transfer molding, as used in conventional integrated circuit packaging. In transfer molding, a preheated charge of thermoset molding compound is moved from a dielectric preheater into the mold cavity through a single inlet port. Transfer molding, as is well-known, is best suited for the type of insert molding required in this embodiment of the present invention, where it is desired to precisely form a connector receptacle which is aligned with an internal optical base member. During the molding process, leadframe 21 (i.e., leads 26) is clamped in place to hold the components as stationary as possible. Base member 46 is further held in place by a retractable pin 54 which prevents motion of base member 46 towards circuit 24. A mandrel 56 is utilized to create inner bore 58 of receptacle 52. Mandrel 56 also holds base member 46 stationary and essentially prevents the thermoset material from entering base member 46 during the molding operation. Pin 54 may retract once the mold cavity is filled so that additional material will be able to flow into the void.

Figure 5:
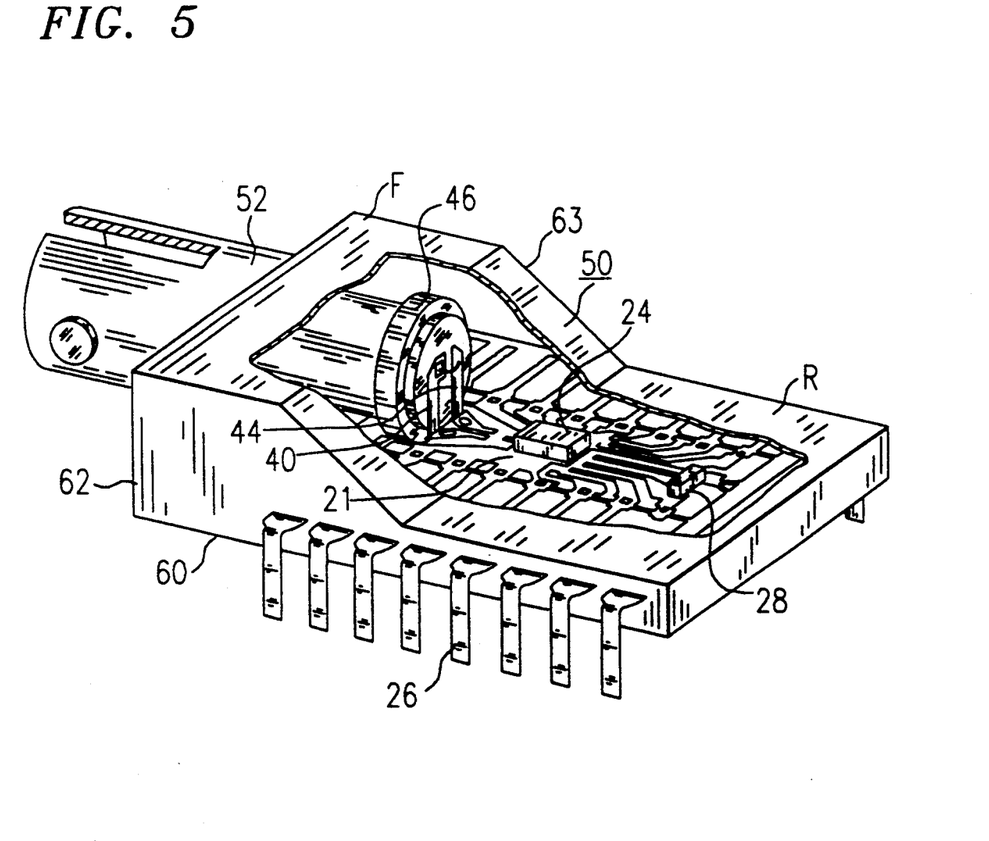
FIG. 5 illustrates a partial cut-away view in perspective of the package of FIG. 4.

FIG. 5 illustrates a partial cut-away view in perspective of an exemplary package formed in accordance with the description of FIG. 4. Illustrated clearly in this view is connector receptacle 52, formed as part of package 50 during the molding process. For the particular arrangement of FIG. 5, package 50 is formed so as to allow leads 26 to exit through sidewalls 62, 63 of package 50.

Figure 6:
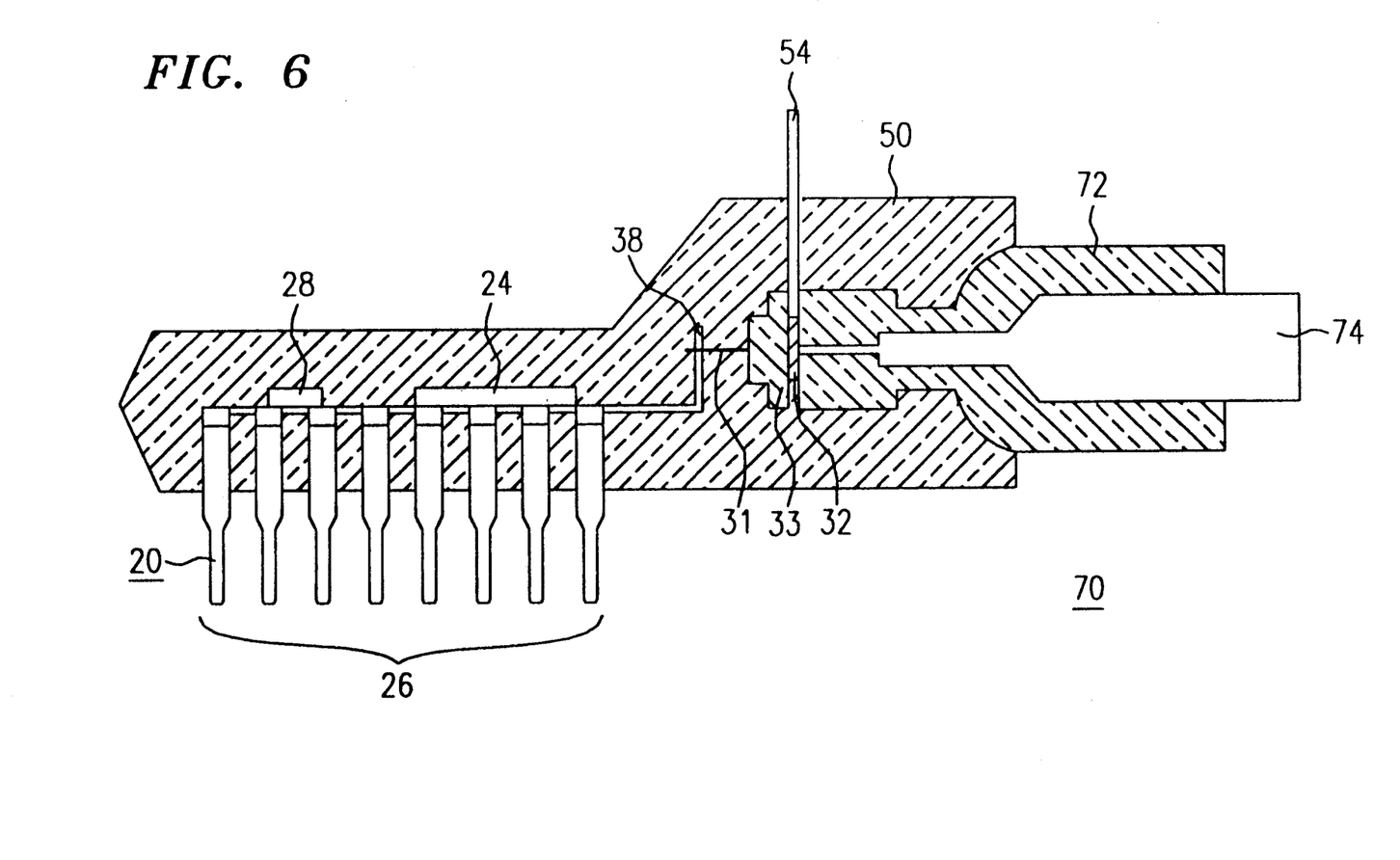
FIG. 6 illustrates a cut-away side view of an alternative molded package utilizing a single piece part base member-connector receptacle.

As mentioned above, a conventional optical subassembly such as OSA 30 of FIG. 2 may be replaced by a combination OSA and connector receptacle. Alternatively, a conventional base member such as member 46 of FIG. 3 may be replaced by a combination base member and connector receptacle. The use of such a combined piece part, in either arrangement, allows for a simpler mold to be utilized. FIG. 6 contains a cut-away side view of an exemplary package 70 illustrating in particular a combination OSA-receptacle 72 (or alternatively, a combination base member-receptacle, if using the FIG. 3 embodiment). As with the arrangements discussed above, package 70 also comprises a leadframe 20 with integrated circuit 24. During the molding operation, leadframe 20 and OSA-receptacle 72 may be clamped in place to remain motionless. The clamping of receptacle 72 thus limits movement of the OSA portion during molding and may eliminate the need for a separate retractable pin. As mentioned, the mold for this particular embodiment is simpler that that associated with the above-described embodiment of FIG. 4, since there is no longer the need to mold a connector receptacle. Therefore, various other molding technologies, including but not limited to, compression molding or injection molding (as well as transfer molding) may be used to form the outer package. A mandrel 74 may be inserted through OSA-receptacle 72 and used to further reduce the likelihood of motion of the components during the molding operation.

Figure 7:
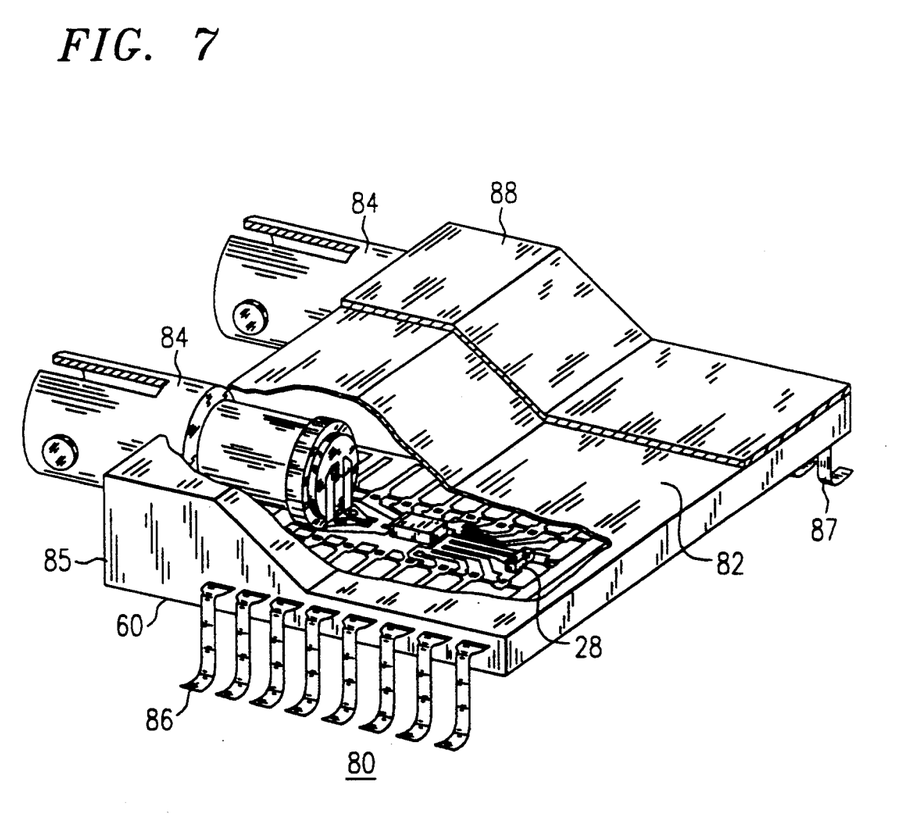
FIG. 7 illustrates a partial cut-away view in perspective of a molded transceiver package for use with a pair of opto-electronic assemblies, the arrangement of FIG. 7 utilizing a pair of base member connector-receptacle piece parts as illustrated in FIG. 6.

FIG. 7 illustrates an alternative arrangement 80 of the present invention where a pair of optical devices and associated electronics are housed within a single outer package 82. The pair of optical devices may comprise an optical transmitting device and optical receiving device, thus forming an optical transceiver. Alternatively, the pair of devices may comprise a pair of optical transmitting devices (for use in a sparing arrangement or as a dual-wavelength transmitter, for example) or a pair of optical receiving devices. For the embodiment of FIG. 7, an arrangement such as discussed above in association with FIG. 3 is utilized where the optical devices are directly attached to the leadframe. Further, arrangement 80 comprises a piece part 84 including a combination of a base member and connector receptacle, as described hereinabove in association with FIG. 6. The combination of the base member and connector receptacle thus simplifies the molding design of package 82 as discussed above. A plurality of leads 86, suitable for surface-mount attachment, is illustrated as exiting through sidewall 85 of arrangement 80. Additionally, arrangement 80 is illustrated as including a metallic coating 88 which is disposed over outer package 82. Metallic coating 88 is utilized to provide, where needed, EMI shielding for the components contained within package 82.

I claim:

1. An optical communication arrangement comprising
    a leadframe section;
    at least one active semiconductor optical device coupled to said leadframe section;
    at least one base member attached to said leadframe to facilitate coupling between said at least one active optical device and an associated optical fiber;
    electronic circuitry attached to said leadframe for operating said at least one optical device; and
    molded outer packaging disposed so as to encapsulate said electronic circuitry, said at least one base member, and said at least one optical device.

2. An optical communication arrangement as defined in claim 1 wherein the arrangement further comprises
    receptacle means aligned with the base member for facilitating attachment of an optical fiber to said arrangement.

3. An optical communication arrangement as defined in claim 2 wherein the outer packaging is molded to include the receptacle means.

4. An optical communication arrangement as defined in claim 1 wherein the base member includes a lensing element aligned with the optical device.

5. An optical communication arrangement as defined in claim 1 wherein the optical device is directly attached and electrically coupled to the leadframe section.

6. An optical communication arrangement as defined in claim 1 wherein the arrangement further comprises mounting means for supporting the optical device wherein the optical device is electrically coupled to the leadframe section.

7. An optical communication arrangement as defined in claim 2 wherein
    the base member is formed to include the receptacle means, the outer packaging molded so as to allow the receptacle portion of the base member to remain exposed.

8. An optical communication arrangement as defined in claim 7 wherein the base member further includes a lensing element aligned with the optical device.

9. An optical communication arrangement as defined in claim 1 wherein the optical device is directly attached and electrically coupled to the leadframe section.

10. An optical communication arrangement as defined in claim 1 wherein the arrangement further comprises a metallic coating disposed over the molded outer packaging.

11. An optical communication arrangement as defined in claim 1 wherein
    the at least one active semiconductor optical device comprises an optical transmitting device; and
    the electronic circuitry comprises a transmitting driver circuit, the arrangement forming an optical transmitter.

12. An optical communication arrangement as defined in claim 1 wherein
    the at least one active semiconductor optical device comprises an optical receiving device; and
    the electronic circuitry comprises an amplifier-decision circuit, the arrangement forming an optical receiver.

13. An optical communication arrangement as defined in claim 1 wherein the at least one active semiconductor optical device comprises a pair of optical devices.

14. An optical communication arrangement as defined in claim 13 wherein the pair of optical devices comprises a transmitting device and a receiving device so as to form an optical transceiver arrangement.

15. An optical communication arrangement as defined in claim 13 wherein the pair of optical devices comprises a pair of optical transmitting devices.

16. An optical communication arrangement as defined in claim 13 wherein the pair of optical devices comprises a pair of optical receiving devices.

17. An optical communication arrangement as defined in claim 1 wherein the outer molded outer packaging comprises a molded plastic material.

18. An optical communication arrangement as defined in claim 17 wherein the molded plastic material comprises a thermoset transfer molded plastic material.

19. An optical communication arrangement comprising:
    a leadframe section;
    an optical subassembly including
        an optical semiconductor optical device including electrical leads coupled to said leadframe section,
        a mounting member for supporting said optical device such that said electrical leads extend therethrough,
        lensing means, and
        a base member for housing said lensing means and facilitating optical coupling between said optical device and an attached optical fiber;
    electronic circuitry attached to said leadframe for operation of said optical device;
    receptacle means for facilitating attachment of an optical fiber to said arrangement; and
    molded outer packaging disposed to encapsulate both said electronic circuitry and said optical device while allowing said receptacle means to remain exposed.

20. An optical communication arrangement as defined in claim 19 wherein the optical subassembly base member is configured to include the receptacle means, the molded outer package formed to allow for said receptacle means to remain exposed.

21. An optical communication arrangement as defined in claim 19 wherein the optical subassembly base member is substantially embedded within the molded outer package, said molded outer package formed to include the receptacle means.

22. An optical communication arrangement as defined in claim 19 wherein the molded outer packaging comprises a plastic material.

23. An optical communication arrangement as defined in claim 22 wherein the plastic material comprises a transfer-molded material.

24. An optical communication arrangement comprising:
   a leadframe section formed to include a paddle lead with an aperture therethrough;
   an active semiconductor optical device, including first and second major surfaces, physically attached along said first major surface to the paddle lead of said leadframe section such that the active region of said optical device is aligned with the aperture, the second major surface electrically coupled to a second lead of said leadframe section;
   an optical base member including a lensing element aligned with the paddle lead, said optical base member for facilitating optical coupling between said optical device and an attached optical fiber;
   electronic circuitry attached to said leadframe section for operation of said optical device;
   receptacle means for facilitating attachment of an optical fiber to said arrangement; and
   molded outer packaging disposed to encapsulate both said electronic circuitry and said optical device while allowing said receptacle means to remain exposed.

25. An optical communication arrangement as defined in claim 24 wherein the optical base member is formed to include the receptacle means and the molded outer packaging is formed such that said receptacle means remains exposed.

26. An optical communication arrangement as defined in claim 24 wherein the optical base member is substantially embedded within the molded outer packaging, said molded outer packaging formed to include the receptacle means.

27. An optical communication arrangement as defined in claim 24 wherein the molded outer packaging comprises a plastic material.

28. An optical communication arrangement as defined in claim 27 wherein the plastic material comprises a transfer-molded plastic.

29. A method for packaging an optical communication arrangement, the method comprising the steps of:
   a) providing a leadframe section;
   b) electrically attaching at least one active semiconductor device to said leadframe section;
   c) attaching to said leadframe section electronic circuitry required for operation of said at least one optical device;
   d) molding an outer package around said leadframe section so as to encapsulate both said at least one optical device and second electronic circuitry; and
   e) providing a connector receptacle which extends beyond the package molded in step d), said connector receptacle for providing physical attachment of a fiber connector to said molded package.

30. The method according to claim 29 wherein steps d) and e) are performed simultaneously such that the outer package is molded to include a connector receptacle.

31. The method according to claim 29 wherein step e) is performed prior to step d) such that the outer package is molded to allow for the connector receptacle to remain exposed.

32. An optical communication arrangement for use with a pair of active optical devices, the arrangement comprising
   a leadframe section;
   a first optical device electrically coupled to said leadframe section;
   a first base member attached to said leadframe section to facilitate coupling between said first optical device and an associated optical fiber;
   first electronic circuitry for operating said first optical device, attached to said leadframe section;
   a second optical device electrically coupled to said leadframe section in a location physically separate from said first optical device;
   a second base member attached to said leadframe section to facilitate coupling between said second optical device and an associated optical fiber;
   second electronic circuitry for operating said second optical device, attached to said leadframe section in a location physically separate from said first electronic circuitry; and
   molded outer packaging disposed so as to encapsulate said first and second optical devices, said first and second base members, and said first and second electronic circuitry.

33. An optical communication arrangement as defined in claim 32 wherein the arrangement further comprises
   first receptacle means aligned with the first base member for facilitating the attachment of a first optical fiber to said arrangement; and
   second receptacle means aligned with the second base member for facilitating the attachment of a second optical fiber to said arrangement.

34. An optical communication arrangement as defined in claim 33 wherein the outer packaging is molded to include the first and second receptacle means.

35. An optical communication arrangement as defined in claim 33 wherein
   the first base member is formed to include the first receptacle; and
   the second base member is formed to include the second receptacle.

36. An optical communication arrangement as defined in claim 32 wherein the first base member includes a first lensing element aligned with the first optical device and the second base member includes a second lensing element aligned with the second optical device.

37. An optical communication arrangement as defined in claim 32 wherein the first and second optical devices are directly attached and electrically coupled to the leadframe section.

38. An optical communication arrangement as defined in claim 32 wherein the arrangement further comprises
   first mounting means for supporting the first optical device wherein said first optical device is electrically coupled to the leadframe section; and
   second mounting means for supporting the second optical device wherein said second optical device is electrically coupled to said leadframe section.

* * * * *